J. DILLIER.
Horse Rake.
No. 58,075.
Patented Sept. 18, 1866.
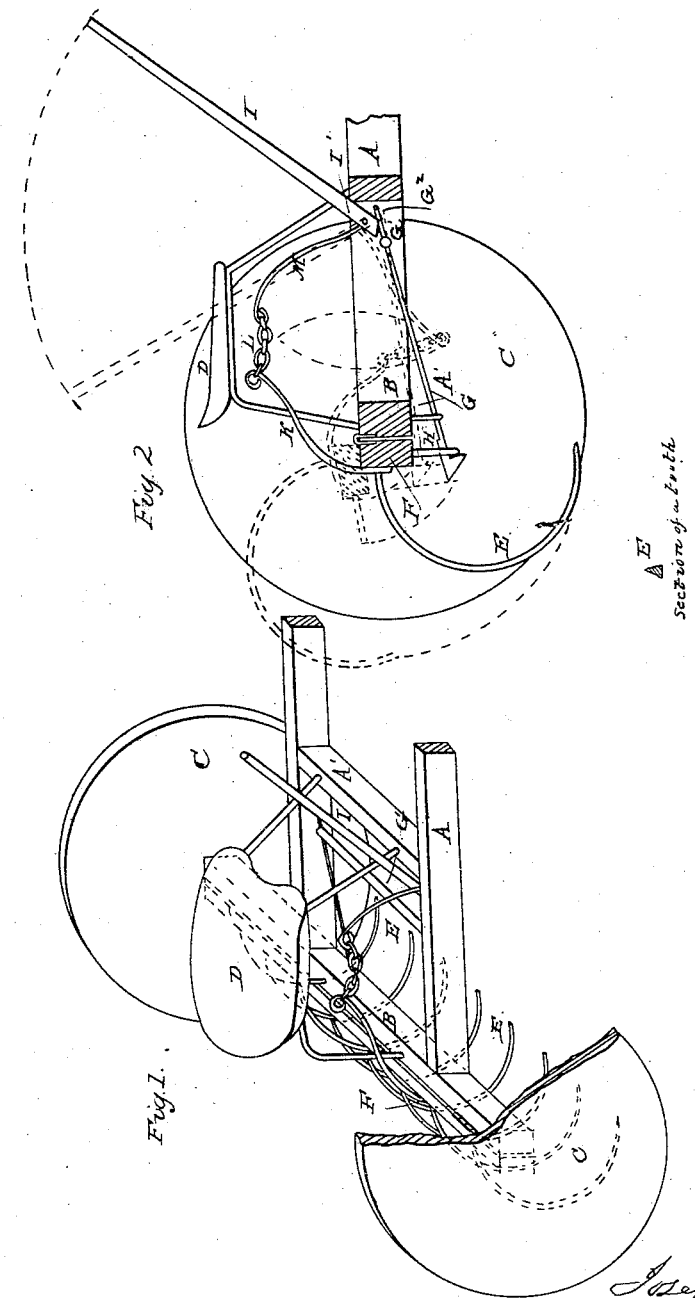

UNITED STATES PATENT OFFICE.

JOSEPH DILLIER, OF GREENSBURG, INDIANA.

IMPROVEMENT IN HORSE-RAKES.

Specification forming part of Letters Patent No. 58,075, dated September 18, 1866.

*To all whom it may concern:*

Be it known that I, JOSEPH DILLIER, of Greensburg, in the county of Decatur and State of Indiana, have invented a new and useful Improvement in Horse Hay-Rakes; and I do hereby declare that the following is a full, clear, and exact description of the construction and operation of the same, reference being had to the annexed drawings, making a part of this specification, in which—

Figure 1 is a perspective view, and Fig. 2 a vertical section.

The same letters in the different figures refer to identical parts.

The object of my invention is to reduce the cost of hay-rakes by simplifying their construction.

To the shafts A is attached the axle B, supported upon the wheels C C. The driver's seat D rests upon the axle and brace A' of the shafts.

The teeth E are curved in the ordinary form; but I make the lower extremities sharp in front, so as to cut their way through tangled grass, &c. These teeth are attached above to the beam F, which is hinged to and folds down against the back of the axle. The beam being turned up raises the teeth above the cut grass.

When the teeth are allowed to fall by their own gravity the loops H on the bottom of the beam catch over the heads of the hooks G, which are placed at each side, and are attached to a common bar, G', which turns in the frame of the shafts A, to which it is attached, so as to give vertical play to the hooks. The stems of the hooks G extend beyond the bar G' in front.

A lever, I, pivoted to the frame A at I', has the toe $I^2$ resting upon the extension $G^2$ of the shank of the hook G, so that when the lever I is raised the hooks G shall also be raised and permit the escape of the loops H from the heads of the hooks. The beam F is at the same time turned, raising the teeth E above the grass by means of the arm K, secured to the beam F, and by the chain L, connected with a corresponding arm, M, attached to the lever I.

What I claim as my invention, and desire to secure by Letters Patent, is—

A horse-rake having the teeth E attached to a hinged beam, F, retained when down by a hook, G, and disengaged and raised by a lever, I, the said several parts being, respectively, constructed and combined for use by intermediate mechanism arranged substantially as set forth.

In testimony whereof I have signed my name to this specification in the presence of two subscribing witnesses.

JOSEPH DILLIER.

Witnesses:
WM. A. MOORE,
CHRIS. SHANE.